United States Patent [19]
Ellis et al.

[11] Patent Number: 5,346,976
[45] Date of Patent: Sep. 13, 1994

[54] ITACONATE COPOLYMERIC COMPOSITIONS FOR CONTACT LENSES

[75] Inventors: Edward J. Ellis, Lynnfield, Mass.; Alfred P. Olson, Barnstead, N.H.; James A. Bonafini, Jr., Lunenburg, Mass.

[73] Assignee: Polymer Technology Corporation, Wilmington, Mass.

[21] Appl. No.: 38,970

[22] Filed: Mar. 29, 1993

[51] Int. Cl.$^5$ .................. C08F 30/08; C08F 20/22
[52] U.S. Cl. .................. 526/279; 523/106; 523/107; 523/108; 525/937; 526/253; 526/242; 526/264; 526/319; 526/323; 526/323.2; 526/325; 526/329.7
[58] Field of Search ............ 526/279, 253, 245; 523/107, 108

[56] References Cited

U.S. PATENT DOCUMENTS

| | | | |
|---|---|---|---|
| 4,152,508 | 5/1979 | Ellis | 526/279 |
| 4,152,508 | 5/1979 | Ellis | 526/279 |
| 4,153,641 | 5/1979 | Deichert | 260/827 |
| 4,330,383 | 5/1982 | Ellis | 204/159.13 |
| 4,508,884 | 4/1985 | Wittman | 526/279 |
| 4,602,074 | 7/1986 | Mizutani | 526/245 |
| 4,686,267 | 8/1987 | Ellis | 526/245 |
| 4,743,667 | 5/1988 | Mizutani | 526/245 |
| 4,780,515 | 10/1988 | Deichert | 526/245 |
| 4,780,515 | 10/1988 | Deichert | 526/245 |
| 4,826,889 | 5/1989 | Ellis | 522/99 |
| 4,826,936 | 5/1989 | Ellis | 526/258 |
| 4,861,850 | 8/1989 | Novicky | 526/243 |
| 4,996,275 | 2/1991 | Ellis | 526/245 |
| 4,996,275 | 2/1991 | Ellis | 526/245 |
| 5,023,305 | 6/1991 | Onozuka | 526/194 |
| 5,132,384 | 7/1992 | Matsuda | 526/321 |

*Primary Examiner*—Fred Zitomer
*Attorney, Agent, or Firm*—John E. Thomas

[57] ABSTRACT

Copolymers useful as contact lens materials are the polymerization product of a mixture comprising:
(a) an itaconate;
(b) a compound represented by formula (I):

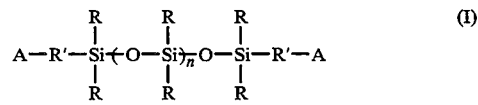

wherein:
each A is independently an activated unsaturated radical;
each R is independently selected from the group consisting of a $C_1$-$C_{12}$ monovalent hydrocarbon radical, a $C_1$-$C_{12}$ monovalent hydrocarbon radical containing ether linkages, a halogen-substituted $C_1$-$C_{12}$ monovalent hydrocarbon radical, and a halogen-substituted $C_1$-$C_{12}$ monovalent hydrocarbon radical containing ether linkages;
each R' is independently a $C_1$-$C_{22}$ divalent hydrocarbon radical; and
n averages about 15 to about 50;
(c) an ethylenically unsaturated organosiloxane monomer; and
(d) a hydrophilic monomer.

19 Claims, No Drawings

ITACONATE COPOLYMERIC COMPOSITIONS FOR CONTACT LENSES

BACKGROUND OF THE INVENTION

This invention relates to improved itaconate copolymers useful as contact lens materials.

Early hard contact lenses were produced from polymethyl methacrylate (PMMA) or cellulose acetate butyrate (CAB). Later, rigid, gas permeable (RGP) contact lenses formed of silicone-containing copolymers were introduced, offering various advantages over PMMA and CAB lenses, particularly increased oxygen permeability. The original silicone-containing RGP lenses were based on copolymers of a silicone-containing monomer and methyl methacrylate, and such lenses remain on the market today.

A newer class of copolymers for silicone-containing RGP lenses is itaconate ester copolymers. U.S. Pat. Nos. 4,152,508 (Ellis et al.), 4,330,383 (Ellis et al.) and 4,826,889 (Ellis et al.) disclose copolymers for contact lenses prepared from: a monofunctional siloxanyl ester monomer; an itaconate ester; an ester of a monohydric or polyhydric alkanol or phenol and a (meth)acrylic acid; a crosslinking agent; and preferably a hydrophilic monomer.

Known copolymers for RGP lenses also include copolymers of fluorinated itaconate esters, such as the copolymers disclosed in U.S. Pat. Nos. 4,686,267 (Ellis et al.) and 4,996,275 (Ellis et al.), which are prepared from a fluorinated itaconate ester and an ethylenically unsaturated organosiloxane.

Other examples of itaconate ester copolymers for RGP lenses are disclosed in the following U.S. Pat. Nos. 4,602,074 (Mizutani et al.); 4,508,884 (Wittmann et al.); 4,743,667 (Mizutani et al.); 4,826,936 (Ellis); and 4,861,850 (Novicky).

As disclosed in U.S. Pat. No. 4,152,508, the itaconate ester provides rigidity, hardness and some degree of wettability to the resultant copolymer. However, the inclusion of an itaconate ester tends to make the resultant copolymers more brittle.

Certain multifunctional organosiloxanes have been described as useful for adding higher impact strength and reducing brittleness of itaconate RGP copolymers. U.S. Pat. No. 4,826,936 describes a class of multifunctional organosiloxanes having the formula:

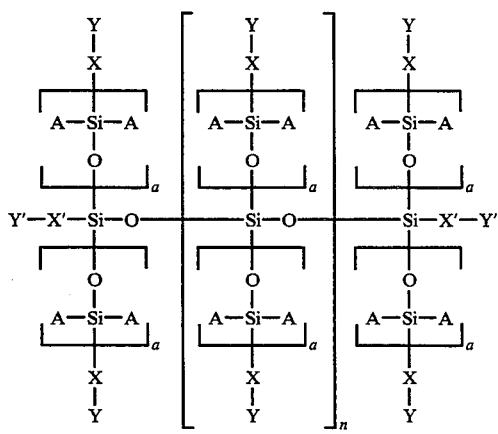

wherein n is 0 to 10, the total "a" values is at least 2, each Y' is an unsaturated polymerizable group, and the remaining variables have the meanings given in the patent. A preferred monomer for itaconate copolymers is 1,3-bis(methacryloxypropyl)-1,1,3,3-tetra(trimethylsiloxy) disiloxane (designated SM-6). Additionally, the aforementioned patents, U.S. Pat. Nos. 4,686,267 and 4,996,275, disclose that the fluorinated itaconate copolymers may include a multifunctional organosiloxane of U.S. Pat. No. 4,826,936. U.S. Patent No. 4,743,667 also discloses multifunctional organosiloxane monomers for RGP contact lens materials described as having high impact strength and reduced brittleness of itaconate ester copolymers. Preferred monomers include 1,5-bis(methacryloxypropyl)-1,1,3,3,5,5-hexamethyl trisiloxane (designated BiMAPPS-1) and 1,3-bis(methacryloxyethoxypropyl)-1,1,3,3-tetramethyl disiloxane (designated BiMAPPS-2). The approaches suggested in each of these patents involve employing a relatively rigid multifunctional organosiloxane wherein the number of siloxane units bridging the polymerizable functional groups is preferably 2 to 4.

SUMMARY OF THE INVENTION

The present invention relates to improved itaconate ester copolymers useful as contact lens materials, particularly rigid gas permeable (RGP) lens materials. The copolymers are the polymerization product of a mixture comprising:

(a) an itaconate;

(b) a compound represented by formula (I):

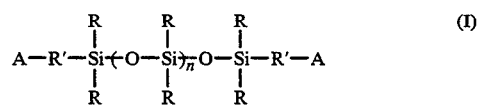

wherein:
  each A is independently an activated unsaturated radical;
  each R is independently selected from the group consisting of a $C_1$–$C_{12}$ monovalent hydrocarbon radical, a $C_1$–$C_{12}$ monovalent hydrocarbon radical containing ether linkages, a halogen-substituted $C_1$–$C_{12}$ monovalent hydrocarbon radical, and a halogen-substituted $C_1$–$C_{12}$ monovalent hydrocarbon radical containing ether linkages;
  each R' is independently a $C_1$–$C_{22}$ divalent hydrocarbon radical; and
  n averages about 15 to about 50;

(c) an ethylenically unsaturated organosiloxane monomer; and (d) a hydrophilic monomer.

The copolymers represent improved itaconate-containing rigid gas permeable (RGP) materials having good toughness and reduced brittleness.

Applicants have found that the siloxane compounds of formula (I) are especially effective in improving the toughness of itaconate copolymers, in contrast to the above-described previous approaches wherein itaconate copolymers employed "shorter" and more rigid multifunctional siloxane compounds.

DETAILED DESCRIPTION OF THE INVENTION

The itaconate copolymers of the present invention are the polymerization product of a mixture comprising:

(a) an itaconate;

(b) a siloxane compound represented by formula (I):

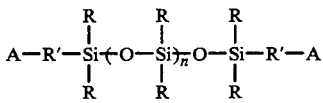

wherein:
  each A is independently an activated unsaturated radical;
  each R is independently selected from the group consisting of a $C_1$-$C_{12}$ monovalent hydrocarbon radical, a $C_1$-$C_{12}$ monovalent hydrocarbon radical containing ether linkages, a halogen-substituted $C_1$-$C_{12}$ monovalent hydrocarbon radical, and a halogen-substituted $C_1$-$C_{12}$ monovalent hydrocarbon radical containing ether linkages;
  each R' is independently a $C_1$-$C_{22}$ divalent hydrocarbon radical; and
  n averages about 15 to about 50;
(c) an ethylenically unsaturated organosiloxane monomer; and
(d) a hydrophilic monomer.

The itaconate esters are known in the art and include compounds of formula (II):

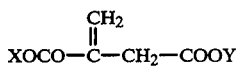

wherein X and Y, which may be the same or different, are independently: hydrogen; $C_1$-$C_{18}$ alkyl or fluoro-substituted alkyl groups; $C_5$-$C_{18}$ cycloalkyl or fluoro-substituted alkyl groups; $C_{21}$-$C_6$ alkenyl groups or fluoro-substituted alkenyl groups; phenyl groups or fluoro-substituted phenyl groups; benzyl or fluoro-substituted benzyl groups; phenethyl or fluoro-substituted phenethyl groups; or $C_2$-$C_{18}$ ether or fluoro-substituted ether groups; provided that at least one of X and Y is other than hydrogen.

Representative itaconates include methyl itaconate, dimethyl itaconate, phenyl itaconate, methyl phenyl itaconate, bis (1,1,1,3,3,3-hexafluoro-2-propyl) itaconate, bis (2,2,2-trifluoroethyl) itaconate, bis (1H,1H-perfluorooctyl) itaconate, bis (1H,1H,1H-perfluoroundecyl) itaconate, bis (perfluoro-t-butyl) itaconate, bis (pentafluorophenyl) itaconate, bis (2H,2H-perfluorobenzyl) itaconate, and bis (pentafluorophenylmethyl) itaconate.

The itaconate is preferably employed at 5 to 60% by weight of the monomeric mixture from which the copolymer is prepared in order to provide copolymers having sufficient rigidity and hardness. According to preferred embodiments, the itaconate is present at 20 to 55 weight percent, with 30 to 50 weight percent being more preferred, in the monomeric mixture.

As recognized in the art, when an itaconate is used in place of, or in combination with, methyl methacrylate, the resultant copolymer has increased rigidity and hardness. However, the inclusion of the itaconate ester also tends to make the resultant copolymer more brittle. RGP contact lens materials are frequently provided in the form of rods, buttons, or lens blanks, which are subsequently machined into contact lenses having desired lens surfaces. When the copolymeric material is brittle, difficulties can be encountered in machining such materials, such as chipping or flaking or even breakage of the material.

Applicants have found that compounds of formula (I) can effectively toughen the resultant copolymer, thereby overcoming the disadvantages attributed to the itaconate monomer. The copolymers represent improved itaconate-containing RGP materials having optical clarity, reduced brittleness, and improved toughness. Preferably, the copolymers have a toughness of at least about 1.2 MPa.mm/mm (as determined by ASTM D 790M-86 standards), and more preferably, a toughness of at least about 1.5 MPa.mm/mm.

The compounds of formula (I) can be produced by general methods known in the art, such as the methods disclosed in U.S. Pat. Nos. 4,153,641, the disclosure of which is incorporated herein by reference.

While various multifunctional organosiloxanes have been described as useful in contact lens formulations, including siloxane compounds of the general formula

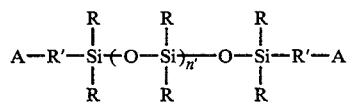

(wherein A, R' and R generally correspond to the definitions given for formula (I), and n' has various ranges), Applicants have found that for itaconate copolymeric contact lens materials, a relatively narrow class of the formula (I) compounds provide consistently the desired effects.

In formula (I), n averages at least about 15. Accordingly, the difunctional siloxane compound of formula (I) is relatively flexible. While not wishing to be bound by any particular theory, it appears that the terminal activated unsaturated groups on such "longer" and relatively flexible difunctional compounds can react with different itaconate portions of the resultant copolymer, thereby providing relatively "flexible" crosslinks between these itaconate portions. In turn, the copolymers have increased toughness and are less brittle.

In contrast, difunctional siloxane compounds corresponding to formula (I) which contain fewer siloxane units and are more rigid do not provide itaconate copolymers having the desired improvements attributed to the present invention.

On the other hand, when difunctional siloxane compounds which contain a relatively large number of siloxane units are employed in conjunction with itaconate ester monomers, phase separation of the individual components in the monomeric mixture appears to occur. This can result in a copolymer which is not transparent and/or has insufficient toughness. Accordingly, n in formula I averages no more than about 50.

In formula (I), A is an activated unsaturated radical, i.e., an unsaturated group that includes a substituent for facilitating free radical polymerization, preferably a vinyl-containing substituent. Representative A radicals include (meth)acryloxy, (meth)acrylamido and styryl. (As used herein, the term "(meth)" denotes optional methyl substitution. Thus, a term such as "(meth)acrylate" denotes "acrylate or methacrylate".) The methacryloxy radical is more preferred.

Each R' is independently a $C_1$-$C_{22}$ divalent hydrocarbon radical. Representative R' radical include alkylene radicals, and preferred radicals include methylene, propylene and butylene.

Each R is independently selected from the group consisting of a $C_1$-$C_{12}$ monovalent hydrocarbon radical, a $C_1$-$C_{12}$ monovalent hydrocarbon radical containing ether linkages, a halogen-substituted $C_1$-$C_{12}$ monovalent hydrocarbon radical, and a halogen-substituted $C_1$–$C_{12}$ monovalent hydrocarbon radical containing ether linkages. Representative R radicals include alkyl, cycloalkyl, aryl, aralkyl, alkaryl radicals, alkoxyalkyl radicals, and halogen-substituted derivatives thereof. Preferred radicals include $C_1$–$C_4$ alkyl, with methyl being especially preferred.

The siloxane compound is employed in an amount effective to reduce the brittleness of the resultant copolymer. Generally, the siloxane compound should be present at about 3 to about 25 weight percent of the initial monomeric mixture, more preferably at about 5 to about 20 weight percent, with about 9 to about 15 weight percent being especially preferred. One skilled in the art can readily determine optimal amounts for specific formulations.

The ethylenically unsaturated organosiloxane monomer (c) (exclusive of the siloxane compound of formula (I) is useful for increasing oxygen permeability of the copolymer. Preferred organosiloxanes are monofunctional organosiloxane containing a (meth)acrylate radical, such as tris(trimethylsiloxy)methacryloxy propylsilane, pentamethyldisiloxanylmethylmethacrylate, heptamethylcyclotetrasiloxanepropylmethacrylate, heptamethylcyclotetrasiloxanemethylmethacrylate and methyldi(trimethylsiloxy)methacryloxymethyl silane. Other organosiloxane monomers known in the art are described in U.S. Pat. No. 4,686,267, the disclosure of which is incorporated herein by reference. The organosiloxane monomer may be included in the monomeric mixture at about 2 to about 60 weight percent, more preferably at about 5 to about 50 weight percent.

The hydrophilic monomer (d) is useful for increasing hydrophilicity and improving wettability of the resultant copolymer. Conventional hydrophilic monomers include: hydrophilic (meth)acrylates, such as 2-hydroxyethyl methacrylate; hydrophilic (meth)acrylamides, such as methacrylamide and N,N-dimethylacrylamide; (meth)acrylic carboxylic acids, such as methacrylic acid; and vinyl lactams, such as N-vinylpyrrolidone. The hydrophilic monomer may be included in the monomeric mixture at about 1 to about 25 weight percent, more preferably at about 5 to about 15 weight percent.

Other materials known for contact lens formulations can be employed in the monomeric mixture from which the itaconate copolymer is prepared.

A (meth)acrylate monomer (e) may be included which further modifies hardness of the copolymer. Such monomers are preferably an ester of a $C_1$–$C_{20}$ monohydric or polyhydric alkanol or phenol and (meth)acrylic acid. Representative monomers include: alkyl (meth)acrylates, such as methyl methacrylate, ethyl methacrylate, and neopentyl methacrylate; cycloalkyl-containing (meth)acrylates, such as cyclohexyl methacrylate; and phenyl methacrylate. This (meth)acrylate may be included in the monomeric mixture at 0 to about 50 weight percent, more preferably at about 5 to about 35 weight percent.

A conventional non-silicone containing crosslinking agent (f) may be employed. Crosslinking agents include polyfunctional derivatives of (meth)acrylic acid, (meth)acrylamide and other multi-vinyl substituted compounds. Representative crosslinking agents include: ethylene glycol dimethacrylate, diethylene glycol dimethacrylate, triethylene glycol dimethacrylate, tetraethylene glycol dimethacrylate, neopentyl glycol dimethacrylate, trimethylolpropane trimethacrylate, hexamethylene bisacrylamide and divinyl benzene. The crosslinking agent may be included in the monomeric mixture at 0 to about 20 weight percent, more preferably at about 1 to about 10 weight percent.

Accordingly, preferred copolymers are prepared from a monomeric mixture comprising:
(a) an itaconate ester at about 5 to about 60 weight percent, preferably about 20 to about 55 weight percent;
(b) a siloxane compound of formula (I) at about 3 to about 25 weight percent, preferably about 5 to about 20 weight percent, and more preferably about 9 to about 15 weight percent;
(c) an ethylenically unsaturated organosiloxane monomer (exclusive of compounds of formula (I)) at about 2 to about 60 weight percent, preferably about 5 to about 50 weight percent;
(d) a hydrophilic monomer at about 1 to about 25 weight percent, preferably about 5 to about 15 weight percent;
(e) a (meth)acrylate monomer at 0 to about 50 weight percent, preferably about 5 to about 35 weight percent; and
(f) a crosslinking agent at 0 to about 20 weight percent, preferably about 1 to about 10 weight percent.

Other optional components include conventional free radical initiators, which are generally employed at 0.01 to 2% by weight, and coloring agents.

The monomeric mixtures can be polymerized by methods known in the art, preferably in the presence of heat or ultraviolet radiation, and if desired, the copolymers can be treated with gamma radiation to reduce any unreacted monomers. Preferably, the mixtures are molded in a shape which is subsequently machined into the form of a contact lens, such as rod stock, a lens button, or a lens blank containing one finished surface. Alternately, the mixtures can be molded directly in the form of a contact lens.

The following examples further illustrate preferred embodiments of the invention.

Various copolymers were polymerized from the monomeric mixtures listed in the following tables, wherein the amounts of the individual components are given in parts by weight. The mixtures were placed in cylindrical tubes, and the tubes were deoxygenated and sealed. The mixtures were polymerized by heating in a water bath (40° C. for 3 days), followed by heating in an oven (65° C. for 2 days). Various copolymers were subjected to post-polymerization treatment to reduce unreacted monomers, including exposure to gamma radiation in an inert atmosphere.

Toughness and modulus were determined according to ASTM-D 790M-86 standards on 0.5-mm disk samples cut from the polymerized rods. Standard deviation is listed parenthetically in the tables. Permeability was determined on 0.5-mm disk samples by the gas-to-gas method.

The results are summarized in the following tables, which include the following abbreviations:
AIBN 2,2-azobisisobutyronitrile (initiator)
AIVN 2,2-azobisisovaleronitrile (initiator)
BHI bis(1,1,1,3,3,3-hexafluoro-2-propyl) itaconate
MAA methacrylic acid
MMA methyl methacrylate
NPGDMA neopentyl glycol dimethacrylate
NPMA neopentyl methacrylate
NVP N-vinyl pyrrolidone
TRIS tris(trimethylsiloxy)silylpropyl methacrylate $M_2D_{15}$ Formula (I) wherein each R is methyl, each R' is butylene, each A is methacrylate, and n averages about 15

$M_2D_{25}$ Formula (I) wherein each R is methyl, each R' is butylene, each A is methacrylate, and n averages about 25

$M_2D_{50}$ Formula (I) wherein each R is methyl, each R' is butylene, each A is methacrylate, and n averages about 50

$M_2D_{100}$ Formula (I) wherein each R is methyl, each R' is butylene, each A is methacrylate, and n averages about 100

$M_2DF_{100}$ Formula (I) wherein each R is trifluoromethyl, each R' is butylene, each A is methacrylate, and n averages about 100

TABLE I

|  | EX 1 | EX 2 | EX 3 |
|---|---|---|---|
| BHI | 43.4 | 45.2 | 45.0 |
| $M_2D_{15}$ | 13.0 | 7.2 | 3.5 |
| MAA | 3.5 | 5.7 | 5.0 |
| MMA | 16.2 | 10.3 | 10.0 |
| NPGDMA | 7.6 | 0 | 0 |
| NVP | 7.6 | 8.3 | 8.0 |
| TRIS | 8.7 | 25.2 | 45.0 |
| AIBN | 0.20 | 0.17 | 0.17 |
| AIVN | 0.059 | 0.050 | 0.050 |
| Toughness | 2.48 | 0.98 | 0.53 |
| (MPa · mm/mm) | (0.57) | (0.07) | (0.03) |
| Modulus | 1613 | 1252 | 1424 |
| (MPa) | (46) | (25) | (45) |
| Clarity | C | C | C |

TABLE II

|  | EX 4 | EX 5 | EX 6 | EX 7 | EX 8 |
|---|---|---|---|---|---|
| BHI | 40.0 | 40.0 | 40.0 | 39.9 | 43.4 |
| $M_2D_{25}$ | 12.0 | 11.0 | 10.0 | 12.0 | 13.0 |
| MAA | 5.0 | 5.0 | 5.0 | 3.2 | 3.5 |
| MMA | 0 | 0 | 0 | 0 | 16.2 |
| NPGDMA | 5.0 | 5.0 | 5.0 | 7.0 | 7.6 |
| NPMA | 25.0 | 27.0 | 29.0 | 22.9 | 0 |
| NVP | 5.0 | 5.0 | 5.0 | 7.0 | 7.6 |
| TRIS | 8.0 | 7.0 | 6.0 | 8.0 | 8.7 |
| AIBN | 0.17 | 0.17 | 0.17 | 0.17 | 0.20 |
| AIVN | 0.054 | 0.054 | 0.054 | 0.054 | 0.059 |
| Toughness | 2.13 | 1.83 | 1.56 | 1.63 | 2.80 |
| (MPa · mm/mm) | (0.23) | (0.62) | (0.39) | (0.50) | (0.76) |
| Modulus | 973 | 1057 | 1016 | 1422 | 1450 |
| (MPa) | (3) | (37) | (24) | (29) | (44) |
| $O_2$ Perm (Dk) | 72 | 66 | 59 | 80 | 40 |
| Clarity | C | C | C | C | C |

TABLE III

|  | EX 9 | EX 10 | EX 11 | EX 12 | EX 13 | EX 14 |
|---|---|---|---|---|---|---|
| BHI | 39.9 | 45.0 | 45.0 | 43.4 | 39.9 | 39.9 |
| $M_2D_{50}$ | 12.0 | 3.5 | 14.0 | 13.0 | 0 | 0 |
| $M_2D_{100}$ | 0 | 0 | 0 | 0 | 12.0 | 0 |
| $M_2DF_{100}$ | 0 | 0 | 0 | 0 | 0 | 12.0 |
| MAA | 3.2 | 5.0 | 5.0 | 3.5 | 3.2 | 3.2 |
| MMA | 0 | 10.0 | 10.0 | 16.2 | 0 | 0 |
| NPGDMA | 7.0 | 0 | 0 | 7.6 | 7.0 | 7.0 |
| NPMA | 22.9 | 0 | 0 | 0 | 22.9 | 22.9 |
| NVP | 7.0 | 8.0 | 8.0 | 7.6 | 7.0 | 7.0 |
| TRIS | 8.0 | 25.0 | 25.0 | 8.7 | 8.0 | 8.0 |
| AIBN | 0.17 | 0.17 | 0.17 | 0.20 | 0.17 | 0.17 |
| AIVN | 0.054 | 0.050 | 0.050 | 0.059 | 0.054 | 0.054 |
| Toughness | 1.82 | 0.40 | 0.42 | 3.00 | 0.80 | 1.08 |
| (MPA · mm/mm) | (0.45) | (0.02) | (0.05) | (0.55) | (0.15) | (0.08) |
| Modulus | 1362 | 1415 | 712 | 977 | 703 | 1290 |
| (MPa) | (36) | (23) | (77) | (153) | (19) | (31) |
| Clarity | H | C | C | C | H | C |

The data summarized in Table I demonstrate that compounds of formula (I) wherein n averages 15 approach the lower end of the range of this class of siloxane compounds which are effective to provide itaconate copolymers having sufficient toughness. Copolymers having satisfactory toughness were obtained with $M_2D_{15}$, but a relatively high amount of $M_2D_{15}$ was required to achieve the advantageous effects.

The data summarized in Table III demonstrate that compounds of formula (I) wherein n averages 50 approach the upper end of the range of the siloxane compounds which are effective to provide itaconate copolymers having good toughness and sufficient clarity for contact lens materials. The copolymer of Example 12 was clear and exhibited very good toughness (3.00 MPa.mm/mm). Example 9 exhibited good toughness, but appeared hazy, and Examples 10 and 11 were clear but exhibited low toughness. In contrast, the copolymer of Example 13, which employed $M_2D_{100}$, had both low toughness and a hazy appearance.

Tables IV and V further illustrate the effect of the number of siloxane units in the formula (I) compounds when the compounds are employed in itaconate copolymers. Each of the formulations in Table IV, and each of the formations in Table V, employ different formula (I) compounds. Generally, copolymers having increased toughness were achieved by employing formula (I) compounds having higher "n" values. However, phase separation occurred with compounds having higher "n" values, resulting in lower toughness and/or haziness. Even though halogen substitution on the siloxane compounds ($M_2DF_{100}$) appeared to lessen the effects of phase separation, such compounds of formula (I), wherein n averages 100, still exhibited insufficient toughness.

TABLE IV

|  | EX 1 | EX 8 | EX 12 |
|---|---|---|---|
| BHI | 43.4 | 43.4 | 43.4 |
| $M_2D_{15}$ | 13.0 | 0 | 0 |
| $M_2D_{25}$ | 0 | 13.0 | 0 |
| $M_2D_{50}$ | 0 | 0 | 13.0 |
| MAA | 3.5 | 3.5 | 3.5 |
| MMA | 16.2 | 16.2 | 16.2 |
| NPGDMA | 7.6 | 7.6 | 7.6 |
| NVP | 7.6 | 7.6 | 7.6 |
| TRIS | 8.7 | 8.7 | 8.7 |
| AIBN | 0.20 | 0.20 | 0.20 |
| AIVN | 0.059 | 0.059 | 0.059 |
| Toughness | 2.48 | 2.80 | 3.00 |
| (MPa · mm/mm) | (0.57) | (0.76) | (0.55) |
| Modulus | 1613 | 1450 | 977 |
| (MPa) | (46) | (44) | (153) |
| $O_2$ Perm (Dk) | 42 | 40 | 44 |
| Clarity | C | C | C |

TABLE V

|  | EX 7 | EX 9 | EX 13 | EX 14 |
|---|---|---|---|---|
| BHI | 39.9 | 39.9 | 39.9 | 39.9 |
| $M_2D_{25}$ | 12.0 | 0 | 0 | 0 |
| $M_2D_{50}$ | 0 | 12.0 | 0 | 0 |
| $M_2D_{100}$ | 0 | 0 | 12.0 | 0 |
| $M_2DF_{100}$ | 0 | 0 | 0 | 12.0 |
| MAA | 3.2 | 3.2 | 3.2 | 3.2 |
| NPGDMA | 7.0 | 7.0 | 7.0 | 7.0 |
| NPMA | 22.9 | 22.9 | 22.9 | 22.9 |
| NVP | 7.0 | 7.0 | 7.0 | 7.0 |
| TRIS | 8.0 | 8.0 | 8.0 | 8.0 |
| AIBN | 0.17 | 0.17 | 0.17 | 0.17 |
| AIVN | 0.054 | 0.054 | 0.054 | 0.054 |
| Toughness | 1.63 | 1.82 | 0.80 | 1.08 |

TABLE V-continued

|  | EX 7 | EX 9 | EX 13 | EX 14 |
|---|---|---|---|---|
| (MPa · mm/mm) | (0.50) | (0.45) | (0.15) | (0.08) |
| Modulus (MPa) | 1422 | 1362 | 703 | 1290 |
|  | (29) | (36) | (19) | (31) |
| O₂ Perm (Dk) | 80 | 89 | 122 | 60 |
| Clarity | C | H | H | C |

Tables VI and VII illustrate additional copolymers which employ the more preferred formula (I) compound, $M_2D_{25}$. Generally, copolymers having higher toughness can be obtained by increasing the amount of this formula (I) compound. Additionally, these examples demonstrate that in order to provide copolymers having a toughness of at least 1.2 MPA.mm/mm, the minimum amount of the formula (I) compound will be about 3% by weight, depending on the specific formulation.

TABLE VI

|  | EX 15 | EX 16 | EX 17 | EX 18 | EX 19 | EX 20 |
|---|---|---|---|---|---|---|
| BHI | 45.0 | 34.1 | 46.6 | 46.6 | 41.4 | 39.9 |
| $M_2D_{25}$ | 14.0 | 9.7 | 9.5 | 9.5 | 6.7 | 6.2 |
| MAA | 5.0 | 2.4 | 4.8 | 4.8 | 3.6 | 4.8 |
| MMA | 10.0 | 0 | 0 | 0 | 0 | 0 |
| NPGDMA | 0 | 11.7 | 11.4 | 6.6 | 8.7 | 11.4 |
| NVP | 8.0 | 6.3 | 3.8 | 8.5 | 6.4 | 8.6 |
| TRIS | 25.0 | 35.5 | 23.8 | 23.8 | 33.0 | 29.0 |
| AIBN | 0.17 | 0.19 | 0.20 | 0.18 | 0.18 | 0.21 |
| AIVN | 0.050 | 0.024 | 0 | 0.024 | 0.016 | 0 |
| Toughness (MPa · mm/mm) | 3.77 (0.04) | 3.28 (0.27) | 2.34 (0.36) | 3.84 (0.29) | 2.29 (0.67) | 2.05 (0.31) |
| Modulus (MPa) | 1005 (20) | 1030 (10) | 962 (81) | 1141 (13) | 1125 (18) | 1330 (37) |

TABLE VII

|  | EX 21 | EX 22 | EX 23 | EX 24 | EX 25 | EX 26 |
|---|---|---|---|---|---|---|
| BHI | 47.7 | 47.1 | 34.2 | 46.6 | 40.9 | 45.0 |
| $M_2D_{25}$ | 2.9 | 2.9 | 2.8 | 2.8 | 2.8 | 3.5 |
| MAA | 2.4 | 3.6 | 4.8 | 4.8 | 4.8 | 5.0 |
| MMA | 0 | 0 | 0 | 0 | 0 | 10.00 |
| NPGDMA | 11.7 | 11.5 | 11.4 | 4.8 | 4.8 | 0 |
| NVP | 8.8 | 8.7 | 8.6 | 8.6 | 8.6 | 8.0 |
| TRIS | 26.3 | 26.0 | 38.0 | 32.3 | 38.0 | 25.0 |
| AIBN | 0.21 | 0.16 | 0.18 | 0.21 | 0.17 | 0.17 |
| AIVN | 0 | 0.048 | 0 | 0 | 0.048 | 0.050 |
| Toughness (MPa · mm/mm) | 1.48 (0.10) | 1.19 (0.11) | 1.39 (0.23) | 0.93 (0.08) | 0.97 (0.05) | 0.56 (0.03) |
| Modulus (MPa) | 1387 (15) | 1422 (31) | 1289 (15) | 1269 (29) | 1190 (28) | 1390 (33) |

Although certain preferred embodiments have been described, it is understood that the invention is not limited thereto and modifications and variations would be evident to a person of ordinary skill in the art.

We claim:

1. A copolymer useful as a contact lens material which is the polymerization product of a mixture comprising:
   (a) an itaconate;
   (b) a siloxane compound represented by formula (I):

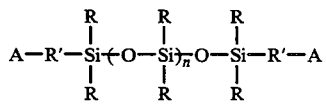

wherein:

each A is independently an activated unsaturated radical;

each R is independently selected from the group consisting of a $C_1$–$C_{12}$ monovalent hydrocarbon radical, a $C_1$–$C_{12}$ monovalent hydrocarbon radical containing ether linkages, a halogen-substituted $C_1$–$C_{12}$ monovalent hydrocarbon radical, and a halogen-substituted $C_1$–$C_{12}$ monovalent hydrocarbon radical containing ether linkages;

each R' is independently a $C_1$–$C_{22}$ divalent hydrocarbon radical; and n averages about 15 to about 50;

(c) an ethylenically unsaturated, monofunctional organosiloxane monomer; and (d) a hydrophilic monomer.

2. The copolymer of claim 1, wherein compound (b) is

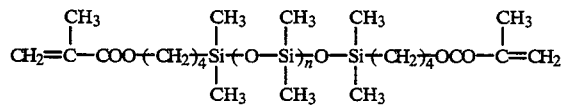

wherein n averages about 25.

3. The copolymer of claim 2, wherein itaconate (a) is bis(1,1,1,3,3,3-hexafluoro-2-propyl) itaconate.

4. The copolymer of claim 1, wherein said mixture comprises:
   (a) the itaconate at about 5 to about 60 weight percent;
   (b) the siloxane compound of formula (I) at about 3 to about 25 weight percent;
   (c) the ethylenically unsaturated, monofunctional organosiloxane monomer at about 2 to about 60 weight percent;
   (d) the hydrophilic monomer at about 1 to about 25 weight percent;
   (e) a hardness modifying (meth)acrylate monomer at 0 to about 50 weight percent; and
   (f) a non-silicone containing crosslinking agent at 0 to about 20 weight percent.

5. The copolymer of claim 4, wherein said mixture comprises:
   (a) the itaconate at about 20 to about 55 weight percent;
   (b) the siloxane compound of formula (I) at about 9 to about 20 weight percent;
   (c) the ethylenically unsaturated, monofunctional organosiloxane monomer at about 5 to about 50 weight percent;
   (d) the hydrophilic monomer at about 5 to about 15 weight percent;
   (e) the (meth)acrylate monomer at about 5 to about 35 weight percent; and
   (f) the non-silicone containing crosslinking agent at about 1 to about 10 weight percent.

6. The copolymer of claim 5, wherein the organosiloxane monomer (c) includes tris(trimethylsiloxy)silylpropyl methacrylate.

7. The copolymer of claim 5, wherein the (meth)acrylate monomer (e) includes at least one alkyl (meth)acrylate.

8. The copolymer of claim 7, wherein the alkyl (meth)acrylate is selected from the group consisting of methyl methacrylate, neopentyl methacrylate, and mixtures thereof.

9. The copolymer of claim 5, wherein the hydrophilic monomer (d) is selected from the group consisting of methacrylic acid, N-vinylpyrrolidone, and mixtures thereof.

10. The copolymer of claim 5, wherein the crosslinking agent (f) includes neopentyl glycol dimethacrylate.

11. The copolymer of claim 4, wherein said mixture comprises:
(a) the itaconate at about 20 to about 55 weight percent;
(b) the siloxane compound of formula (I) at about 9 to about 20 weight percent;
(c) the ethylenically unsaturated, monofunctional organosiloxane monomer at about 5 to about 50 weight percent;
(d) the hydrophilic monomer at about 5 to about 15 weight percent; and
(e) the (meth)acrylate monomer at about 5 to about 35 weight percent.

12. The copolymer of claim 4, wherein said mixture comprises:
(a) the itaconate at about 20 to about 55 weight percent;
(b) the siloxane compound of formula (I) at about 9 to about 20 weight percent;
(c) the ethylenically unsaturated, monofunctional organosiloxane monomer at about 5 to about 50 weight percent;
(d) the hydrophilic monomer at about 5 to about 15 weight percent; and
(f) the non-silicone containing crosslinking agent at about 1 to about 10 weight percent.

13. A copolymer of claim 1, wherein said mixture consists essentially of: bis(1,1,1,3,3,3-hexafluoro-2-propyl) itaconate; the compound

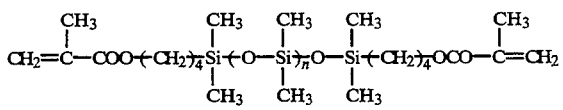

wherein n averages about 25; tris(trimethylsiloxy)silylpropyl methacrylate; methacrylic acid; N-vinylpyrrolidone; at least one monomer selected from the group consisting of methyl methacrylate and neopentyl methacrylate; and at least one free radical initiator.

14. A copolymer of claim 1, wherein said mixture consists essentially of: bis(1,1,1,3,3,3-hexafluoro-2propyl) itaconate; the compound

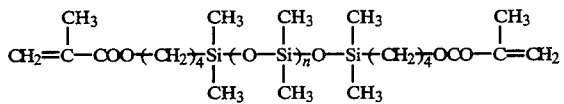

wherein n averages about 25; tris(trimethylsiloxy)silylpropyl methacrylate; methacrylic acid; N-vinylpyrrolidone; neopentyl glycol dimethacrylate; neopentyl methacrylate; and at least one free radical initiator.

15. A rigid, gas permeable contact lens formed of a copolymer which is the polymerization product of a mixture comprising:
(a) an itaconate;

(b) a siloxane compound represented by formula (I):

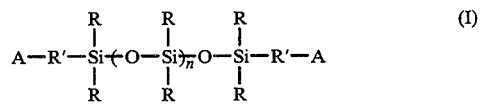

wherein:
each A is independently an activated unsaturated radical;
each R is independently selected from the group consisting of a $C_1$-$C_{12}$ monovalent hydrocarbon radical, a $C_1$-$C_{12}$ monovalent hydrocarbon radical containing ether linkages, a halogen-substituted $C_1$-$C_{12}$ monovalent hydrocarbon radical, and a halogen-substituted $C_1$-$C_{12}$ monovalent hydrocarbon radical containing ether linkages;
each R' is independently a $C_1$-$C_{22}$ divalent hydrocarbon radical; and
n average about 15 to about 50; and
(c) an ethylenically unsaturated, monofunctional organosiloxane monomer; and
(d) a hydrophilic monomer.

16. The contact lens of claim 15, wherein compound (b) has the formula

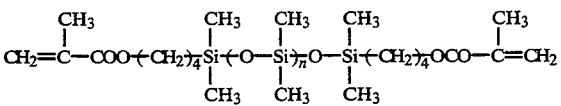

wherein n averages about 25.

17. The contact lens of claim 16, wherein the itaconate is bis(1,1,1,3,3,3-hexafluoro-2-propyl) itaconate.

18. The contact lens of claim 15, wherein the copolymer is the polymerization product of a mixture consisting essentially of: bis(1,1,1,3,3,3-hexafluoro-2-propyl) itaconate; the compound

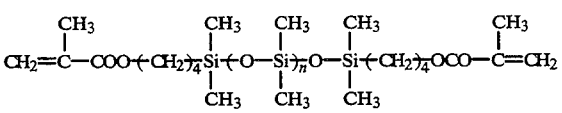

wherein n averages about 25; tris(trimethylsiloxy)silylpropyl methacrylate; methacrylic acid; N-vinylpyrrolidone; at least one monomer selected from the group consisting of methyl methacrylate and neopentyl methacrylate; and at least one free radical initiator.

19. The contact lens of claim 15, wherein the copolymer is the polymerization product of a mixture consisting essentially of: bis(1,1,1,3,3,3-hexafluoro-2-propyl) itaconate; the compound

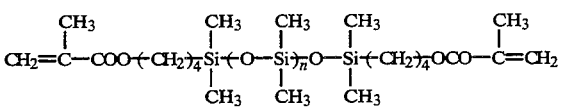

wherein n averages about 25; tris(trimethylsiloxy)silylpropyl methacrylate; methacrylic acid; N-vinylpyrrolidone; neopentyl glycol dimethacrylate; neopentyl methacrylate; and at least one free radical initiator.

* * * * *

UNITED STATES PATENT AND TRADEMARK OFFICE
CERTIFICATE OF CORRECTION

PATENT NO. : 5,346,976
DATED : September 13, 1994
INVENTOR(S) : Edward J. Ellis, Alfred P. Olson, and James A. Bonafini, Jr.

It is certified that error appears in the above-indentified patent and that said Letters Patent is hereby corrected as shown below:

In column 5, line 18, change "(I)" to -- (I)) --.

In column 5, line 22, insert after "pentamethyldisiloxanylmethylmethacrylate," the word -- phenyltetramethyldisiloxanylethylacrylate --.

In column 11, line 48, change "bis(1,1,1,3,3,3-hexafluoro-2pro-" to --bis(1,1,1,3,3-hexafluoro-2-pro- --.

Signed and Sealed this

Seventeenth Day of January, 1995

Attest:

BRUCE LEHMAN

*Attesting Officer*     *Commissioner of Patents and Trademarks*